Sept. 5, 1944. J. TAYLOR 2,357,435
SHUTTER
Filed Nov. 8, 1943
FIG. 1
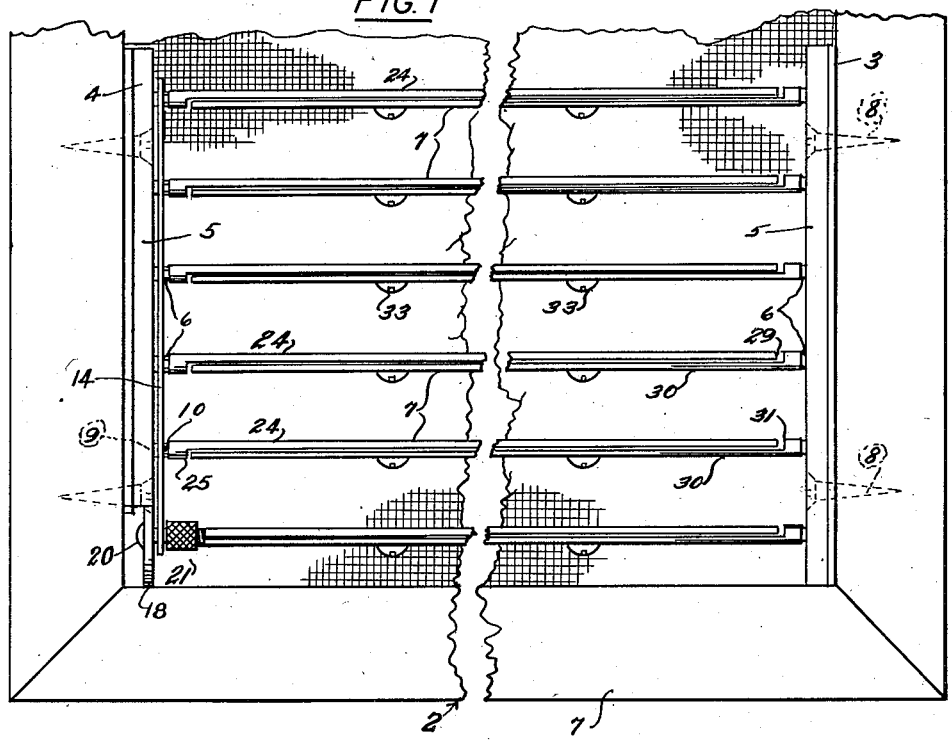
FIG. 2
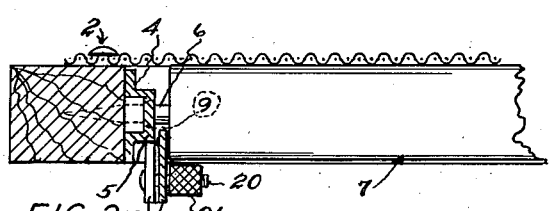
FIG. 7
FIG. 3
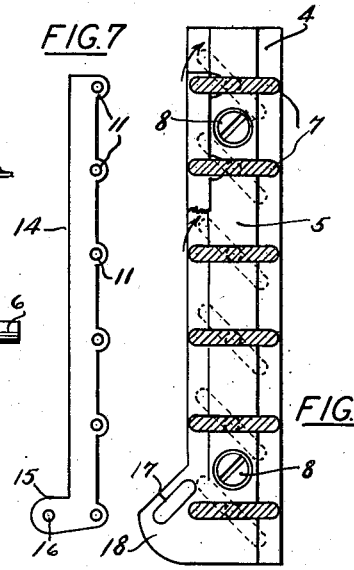
FIG. 5
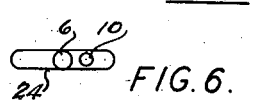
FIG. 6
FIG. 4
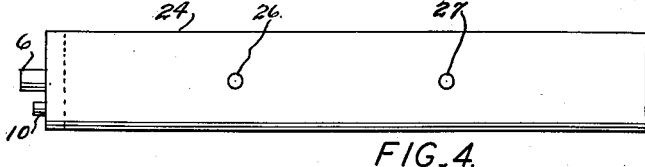
INVENTOR
Jack Taylor
BY Scott L. Norvil
attorney Patented Sept. 5, 1944

2,357,435

UNITED STATES PATENT OFFICE 2,357,435

SHUTTER

Jack Taylor, Whipple, Ariz.

Application November 8, 1943, Serial No. 509,521

4 Claims. (Cl. 160—89)

This invention pertains to interior shutters of a type that may be applied to the inside of a screen frame.

The ordinary storm shutter is placed on the outside of both the window and the screen. This shutter is intended to afford partial coverage, particularly of the lower part of the window and has for its objects:

First, to provide a shutter of a type which may be permanently or temporarily fastened to the inside of the wire screen frame of a window or similar opening and may be manipulated so as to exclude light from the part of the frame to which it is attached, and at the same time permit free flow of air therethrough;

A second object is to provide a shutter that may be easily attached to the inside of the frame of a window screen, which may be adjusted and manipulated so that vision into the interior of the room will be excluded but that free ventilation of air thereinto is permitted;

A third object is to provide a shutter of the type above stated which is readily adapted to various widths of window screens and otherwise so constructed that it may be easily and quickly installed with a minimum of tools and equipment; and A still further object is to provide such a shutter construction including the slats and supporting members all arranged so that the parts may be easily, cheaply and efficiently manufactured from molded substances commonly known as plastics.

Other objects will appear hereinafter.

I attain the foregoing objects by means of the devices illustrated in the accompanying drawing, in which—

Figure 1 is a front elevation of the shutter as installed;

Figure 2 is a partial section thereof taken substantially on lines 2—2, Figure 1;

Figure 3 is an interior sectional elevation taken substantially on lines 3—3, Figure 1;

Figure 4 is a plan view of the left half portion of a shutter slat;

Figure 5 is a plan view of the right half portion of the shutter slat;

Figure 6, an end elevation of a shutter slat; and

Figure 7, an elevational view of the interconnecting vertical adjustment lever used to move the slats in unison.

Similar numerals refer to similar parts in the several views.

Within the screen frame 2, the shutter structure consists mainly of right and left side pieces 3 and 4, having a raised central portion 5 sufficient to permit the insertion of supporting pins 6 attached to the ends of each composite shutter slats 7 and forming a bearing mount therefor. These side supporting members are secured to the inside of preferably the lower portion of a screen frame 2 by screws 8 driven through holes prepared at predetermined positions in the side members and thence into the wood of the frame. Within the raised portion 5 of each of these side members there are bearing holes drilled or otherwise formed to receive the shutter bearing pins 6. These holes are equi-distantly spaced and are spaced sufficiently close together so that when the slats are turned to a nearly vertical position the adjacent edges abut so as to form a comparatively solid structure. In the left hand end of each of the slats there is an operative pin 10 positioned between the near edge of the slat and the central supporting pin. These pins are long enough to extend from the end edge of the slat to the inner face of the supporting member 4 and to extend into holes 11 drilled in the vertical adjusting member 14 which is positioned on the left side and works vertically between the inner face of the member 4 and the end edges of the slats on the left side. At the lower end this piece extends outwardly to form a lug 15 which carries a hole 16 positioned to register with slot 17 in a forwardly extending portion 18 at the lower end of side member 4. A machine screw 20 having a knurled nut 21 extends through the slot 17 and hole 16 and is used to set the adjustment bar in whatever desired vertical position may be desired. Each of the holes 11 in the adjustment bar fits over one of the bearing members 10 and, therefore, if this is raised or lowered the slats 7 are turned upon their bearings 6, as indicated by the dotted outlines in Figure 3.

Each slat consists of two parts. The left part 24 carrying a bearing pin 6 and an end adjustment pin 10 on its end edge is cut away at 25 to form a shoulder and its section extends half the thickness of the end portion or the balance of its length. The upper longitudinal edges of this slat portion are smoothly rounded. At approximately the middle of the thin portion there are two holes 26 and 27 equi-distantly spaced from the shoulder 25 and the end 29 of this portion. The right hand portion 30 of each slat carries a bearing pin 6 at its right end. This end extends to a shoulder 31 from whence it extends in a thin section, making a counterpart match for the slat part 24. A slot 32 is centrally positioned throughout the left or inner end of this slat portion. The two portions of the slats are held together by two machine screws 33 which screw into the soles 26 and 27 in portion 24 and have rather large oval shaped heads which extend beyond the edges of slots 32. The diameter of these screws is such that their shanks fit rather snugly into the slot 32.

In use the side members 3 and 4 are affixed to the inner faces of the screen frame and fastened with screws 8. The slats are then assembled but screws 33 are not tightened. The adjusting bar 14 is then put in place and held temporarily by screw and nut 20 and 21. The slats are then individually set in place and extended longitudinally until their end bearings are inserted into the holes 9 prepared for them in the side members 3 and 4 and the pins 10 set into the proper holes 11 in the member 14. As they are extended into this position the machine screws 33 are set up tightly and the slat becomes a unit. After all slats are in place the entire gang of them is operated by member 14 to whatever angle is desired to secure ventilation but excluding sunlight or vision from the outside and this adjustment maintained by nut 21.

From the foregoing it will be readily understood that the several parts of the device may be readily formed of sheet metal or other similar substance. However, the structure as above described, is more readily adapted to the use of plastics from which the several parts may be molded in quantities. Thus the end pieces can readily be molded from plastics in a manner so that only one mold is necessary, that is, the right end member 3 may be cut off from the upper portion of left end member 4 which carries the extension 18 at its base. The adjusting member 14 may be made any desired length and cut to the length needed when installed. The slats are adjustable longitudinally, as is readily understood from the above description, within the limits of their overlapping portions.

One of the objects of the invention is to supply these parts in knock down or kit form so that they may be readily merchandised either as individual units or as a complete kit ready for installation. The above description indicates that the parts are of almost universal adaption to any varying installations on which they may be used. I propose to manufacture the side members in a uniform side width comparable with the thickness of screen frames ordinarily used but in an indeterminate length. Where these devices are sold to be installed by the user, he may readily cut the desired length, as installed, in proportion to the number of slats desired. For this reason the side members are symmetrical relative to their vertical center and the holes 9 are so spaced that the distance of the lower hole from the bottom edge is the same as that from the top of the single molded piece from which the two side members may be readily cut. The adjusting member 14 may be molded in maximum lengths with the understanding that it may be cut off to the length needed when installed. The slat portions may be made in pairs with several longitudinal standard sizes, all of which, however, may be readily interchangeable and constructed so that the end pins are uniform and interchangeable. Thus pairs of slats may be sold which have a definite maximum or minimum adjustment.

I claim:

1. A shutter for window screens, comprising in combination, side members adapted to attachment to the side frame members of a window screen, extensible shutters pivotably supported thereon, and an adjusting bar inter-connecting said shutters so as to co-ordinately rotate and hold them in predetermined rotative position.

2. A shutter for window screens, comprising in combination, side members adapted to be attached to the inner side edges of a window screen, and having bearing holes to receive shutter slat bearing pins, and composite slats consisting of two partially over-lapping parts having bearing pins at the outer ends, and means for retaining said parts in fixed relative longitudinal position, together with a vertical adjusting member adapted to co-ordinately rotate said slats.

3. A shutter for window screens, comprising in combination, side members adapted to attachment to the sides of a window screen frame, composite extensible slats composed of right and left parts and means for retaining said parts in relatively fixed positions rotatably supported between said side members, and an interconnecting adjusting member pivoted to each of said slats eccentric to their axis of rotation with means of retention on one of said side members whereby said slats may be co-ordinately rotated and retained in position.

4. A shutter for window screens, comprising in combination, right and left side members adapted to be attached to the inside portions of a window screen, said members having raised portions each provided with bearing holes, the holes in one member severally alining with the holes in the other member, one of said members having a forwardly extending lower portion provided with an angularly extending slot, a plurality of extensible slats having bearing pins at their ends adapted to be journaled in said holes in said side members, said slats being composed of right and left overlapping mating parts, one of said parts of each of said slots having an adjusting pin eccentrically positioned relative to its said end bearing pin, and set screws longitudinally positioned along its turning axis, the other part having an axially extending slot adapted to register with said set screws, and a vertical adjusting member having bearing holes to receive said adjusting pins of said slat parts, and a locking nut and screw in its bottom part adapted to engage in said angularly-extending slot.

JACK TAYLOR.